(12) United States Patent
Dwight

(10) Patent No.: US 10,854,053 B2
(45) Date of Patent: Dec. 1, 2020

(54) EMERGENCY ALERT

(71) Applicant: Galactic Smarties, LLC, South Deerfield, MA (US)

(72) Inventor: Leslie Dwight, South Deerfield, MA (US)

(73) Assignee: Galactic Smarties, LLC, Deerfield, MA (US)

( * ) Notice: Subject to any disclaimer, the term of this patent is extended or adjusted under 35 U.S.C. 154(b) by 0 days.

(21) Appl. No.: 16/616,621

(22) PCT Filed: May 10, 2018

(86) PCT No.: PCT/US2018/032037
§ 371 (c)(1),
(2) Date: Nov. 25, 2019

(87) PCT Pub. No.: WO2018/217469
PCT Pub. Date: Nov. 29, 2018

(65) Prior Publication Data
US 2020/0098230 A1    Mar. 26, 2020

Related U.S. Application Data

(60) Provisional application No. 62/511,343, filed on May 25, 2017.

(51) Int. Cl.
| | |
|---|---|
| G08B 7/06 | (2006.01) |
| H04W 4/90 | (2018.01) |
| G08B 17/10 | (2006.01) |
| G08B 25/01 | (2006.01) |
| G09B 9/00 | (2006.01) |
| H04W 4/20 | (2018.01) |

(52) U.S. Cl.
CPC .............. *G08B 7/066* (2013.01); *G08B 17/10* (2013.01); *G08B 25/014* (2013.01); *G09B 9/00* (2013.01); *H04W 4/20* (2013.01); *H04W 4/90* (2018.02)

(58) Field of Classification Search
None
See application file for complete search history.

(56) References Cited

U.S. PATENT DOCUMENTS

| | | | | |
|---|---|---|---|---|
| 8,000,678 B1 * | 8/2011 | Klesper | .................. | H04M 11/04 455/404.2 |
| 8,538,374 B1 * | 9/2013 | Haimo | .................. | G01S 5/0027 455/404.2 |
| 8,718,596 B1 * | 5/2014 | Xue | ...................... | H04W 76/50 455/404.2 |
| 9,195,866 B1 * | 11/2015 | Mehranfar | ......... | G06K 7/10425 |

(Continued)

*Primary Examiner* — Fekadeselassie Girma
(74) *Attorney, Agent, or Firm* — Cognition IP, P.C.; Edward Steakley

(57) ABSTRACT

Described are systems and methods for providing instructions in response to an emergency. An emergency alert system may receive indication of an emergency situation in a building. In response, the emergency alert system may determine personalized emergency response instructions for an occupant of the building based on the location and type of emergency. The emergency alert system may present the personalized emergency response instructions to the occupant and monitor the progress of the occupant in following the instructions. Some aspects relate to performing emergency response drills and monitoring performance of occupants participating in drills.

21 Claims, 16 Drawing Sheets

(56) References Cited

U.S. PATENT DOCUMENTS

| | | | | |
|---|---|---|---|---|
| 9,361,784 B1* | 6/2016 | Alamri | G08B 25/016 |
| 9,373,014 B1* | 6/2016 | Mehranfar | G06K 7/10366 |
| 9,741,237 B1* | 8/2017 | Knas | G06Q 90/20 |
| 9,756,495 B1* | 9/2017 | Powers | H04W 12/00503 |
| 10,171,935 B1* | 1/2019 | Reyes | G01S 5/02 |
| 2004/0098237 A1* | 5/2004 | Pendergraft | G06Q 10/04 |
| | | | 703/7 |
| 2005/0003797 A1* | 1/2005 | Baldwin | H04W 4/90 |
| | | | 455/404.1 |
| 2007/0124144 A1* | 5/2007 | Johnson | H04W 4/90 |
| | | | 704/246 |
| 2010/0184401 A1* | 7/2010 | Spence | H04M 11/04 |
| | | | 455/404.2 |
| 2014/0253326 A1* | 9/2014 | Cho | G08B 7/066 |
| | | | 340/539.13 |
| 2014/0368601 A1* | 12/2014 | deCharms | H04L 65/403 |
| | | | 348/14.02 |
| 2015/0104768 A1* | 4/2015 | Clark | G09B 19/0038 |
| | | | 434/219 |
| 2015/0279184 A1* | 10/2015 | Kore | G08B 25/016 |
| | | | 340/539.13 |
| 2016/0119424 A1* | 4/2016 | Kane | H04L 67/10 |
| | | | 709/203 |
| 2016/0142492 A1* | 5/2016 | Fang | H04W 4/44 |
| | | | 370/254 |
| 2016/0210581 A1* | 7/2016 | Braun | G16H 40/67 |
| 2016/0337828 A1* | 11/2016 | Michaelis | G06N 5/045 |
| 2017/0099579 A1* | 4/2017 | Ryan | H04M 3/5116 |
| 2017/0124853 A1* | 5/2017 | Mehta | H04W 4/90 |
| 2017/0180486 A1* | 6/2017 | Mehta | H04L 67/142 |
| 2017/0272925 A1* | 9/2017 | Rupanagudi Venkata | H04W 76/28 |
| 2017/0294136 A1* | 10/2017 | Sada | G09B 7/06 |
| 2017/0310827 A1* | 10/2017 | Mehta | H04M 3/42357 |
| 2017/0325056 A1* | 11/2017 | Mehta | H04M 11/04 |
| 2018/0018355 A1* | 1/2018 | Toivanen | G06F 16/30 |
| 2018/0049011 A1* | 2/2018 | Cantrell | H04W 4/90 |
| 2018/0052458 A1* | 2/2018 | Tsuji | B60W 50/14 |
| 2018/0053401 A1* | 2/2018 | Martin | G08B 29/188 |
| 2018/0068077 A1* | 3/2018 | Schapiro | G08B 25/005 |
| 2018/0105186 A1* | 4/2018 | Motomura | G05D 1/0088 |
| 2018/0157563 A1* | 6/2018 | Bryant | G06F 11/3062 |
| 2018/0174430 A1* | 6/2018 | Sieja | G06Q 10/1091 |
| 2018/0248881 A1* | 8/2018 | Mueller | G06F 21/36 |

* cited by examiner

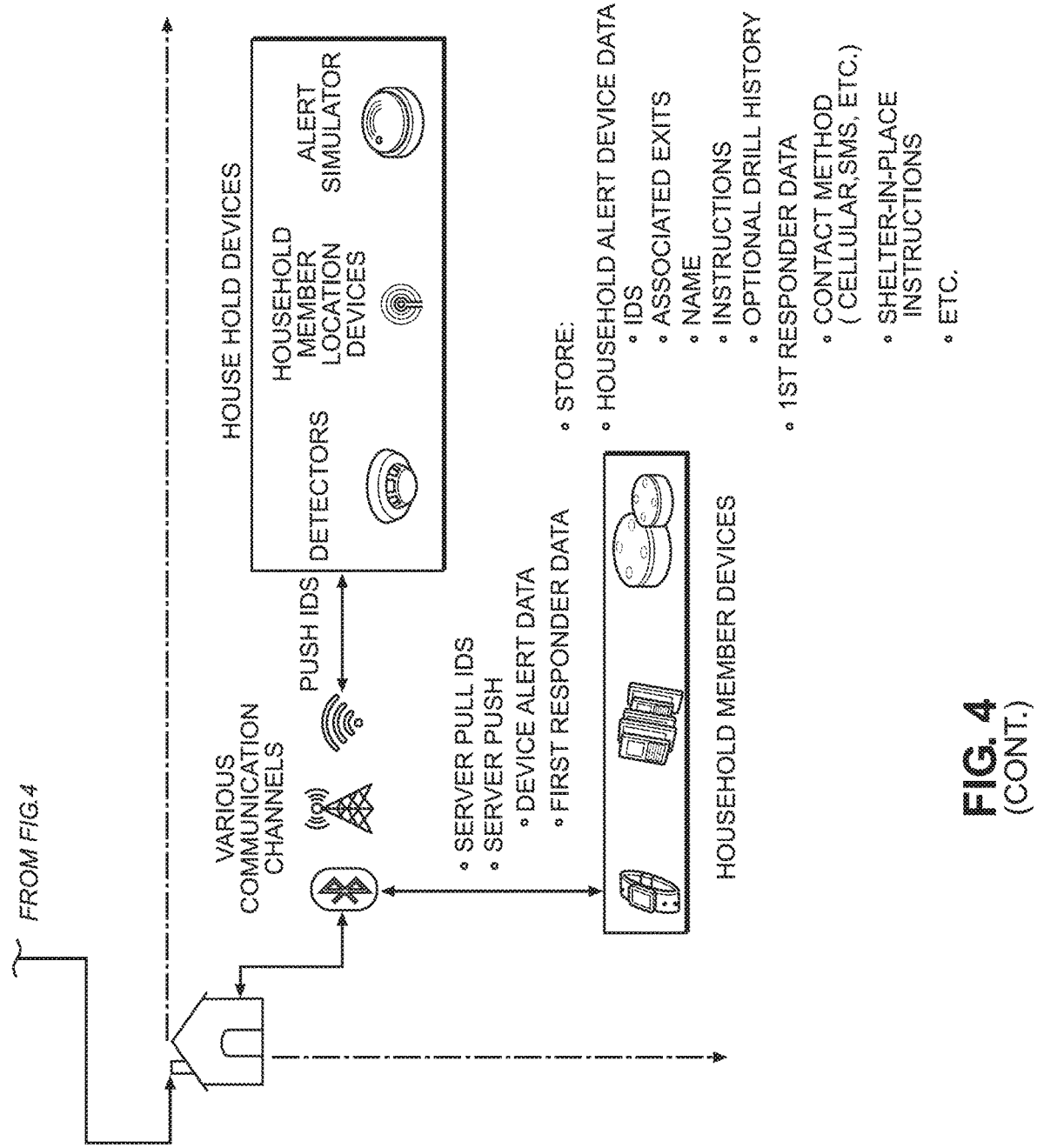

EMERGENCY ALERT

CROSS-REFERENCE TO RELATED APPLICATIONS

This application is a 35 U.S.C. § 371 national stage application of PCT International Application No. PCT/US18/32037, filed on May 10, 2018, which claims the benefit of U.S. Provisional Application No. 62/511,343, filed May 25, 2017. The above-referenced applications are incorporated by reference in their entirety herein.

FIELD

The present disclosure relates to automated information presentation and computer interaction and, more particularly, a method and system that automatically present information through a variety of devices and interfaces in a novel fire safety system.

BACKGROUND

Fire detectors are known and sound an alarm in response to detecting smoke, heat, or a combination of smoke and heat that indicate a fire condition within a building.

While this may be sufficient information for some occupants, some populations of people may not be suitably alerted by these known systems. For example, people with certain cognitive impairments may have difficulty in determining how to respond to a fire alarm. One particular population for whom a standard fire alarm announcement may be insufficient are people with executive function impairment. Executive function refers to the ability to process information and individuals with impairment in this area may be overwhelmed by a loud siren accompanied by a verbal announcement of the location or severity of a detected fire. Individuals with other cognitive impairments such as down syndrome, autism, traumatic brain injury, and other such impairments may similarly find these known fire alarms to be insufficient or confusing.

For these populations, a standard smoke detector alarm is worse than unhelpful—it can often cause the person to be overwhelmed and immobilized. During a fire emergency, these individuals may be at increased risk of injury if they do not safely exit the building. In part because of this, people with disabilities are 4-6 times more likely to be killed or severely injured in a fire.

SUMMARY

Described herein are systems and methods for emergency alerting. Embodiments described in this disclosure provide for emergency alert systems and methods incorporating customized spoken instructions on instructing building occupants on how to respond to an emergency. Disclosed alert systems decrease the confusion and anxiety associated with emergency alerts. While helpful for all people, the disclosed alert systems are particularly beneficial for populations of people with some level of cognitive impairment for whom traditional emergency alerting systems are not well suited. The alert systems described here remove the crisis from the emergency and provide familiar instructions with the alert so that people can respond effectively and respond safely.

Aspects of embodiments described herein further relate to systems and methods for facilitating emergency drills. Some embodiments track emergency drill performance of building occupants and adapt announcements to better guide occupants during an emergency. Some embodiments interface with a wide range of home and electronic and safety devices to facilitate and track emergency drills.

DETAILED DESCRIPTION

Emergency alert systems and methods are disclosed herein. Some embodiments relate to emergency alert systems and methods that are more suitable for individuals with cognitive impairments. For these individuals, traditional emergency alert systems may cause confusion and anxiety as a result of shrill sounds and confusing instructions. Emergency alerts described in the embodiments below avoid these problems and improve safety of all building occupants. For example, an emergency alert according to an embodiment may announce emergency instructions personalized for specific individuals such as: "There is a fire in the kitchen, Aidan, so you need to go out the window in Aunt Sally's room."

Aspects of various embodiments disclosed herein further relate to systems and methods for conducting emergency response drills. These embodiments improve occupant safety by performing emergency response drills and tracking responses of building occupants. Regular practice and performance tracking using the embodiments described below may further improve safety by conditioning occupants as to the proper procedures for responding to emergencies.

Some examples provided herein are described in the context of a home. However, the emergency alert systems and methods described herein may be employed in any other setting. For example, embodiments describe herein may be used in schools, office buildings, single-family dwellings, apartment homes, correctional facilities, hotels, hospitals, or other such buildings or facilities. Further, embodiments described herein may be used in multi-building campuses such as educational campuses, healthcare campuses, or other groups of buildings that are related. In addition, various embodiments may be used in outdoor settings such as campgrounds, parks, places of public accommodation, or other such settings where people may need to be alerted as to an emergency situation.

Some examples provided herein are described in regards to a fire emergency. However, embodiments may be used to respond to any type of emergency. For example, the embodiments described below may be used for responding to carbon monoxide emergencies, hurricanes, earthquakes, floods, other severe weather or natural disasters, active shooter emergencies, malicious intrusions, other security-related emergencies, or other similar situations which require people to respond to an emergent situation.

Figure 1:
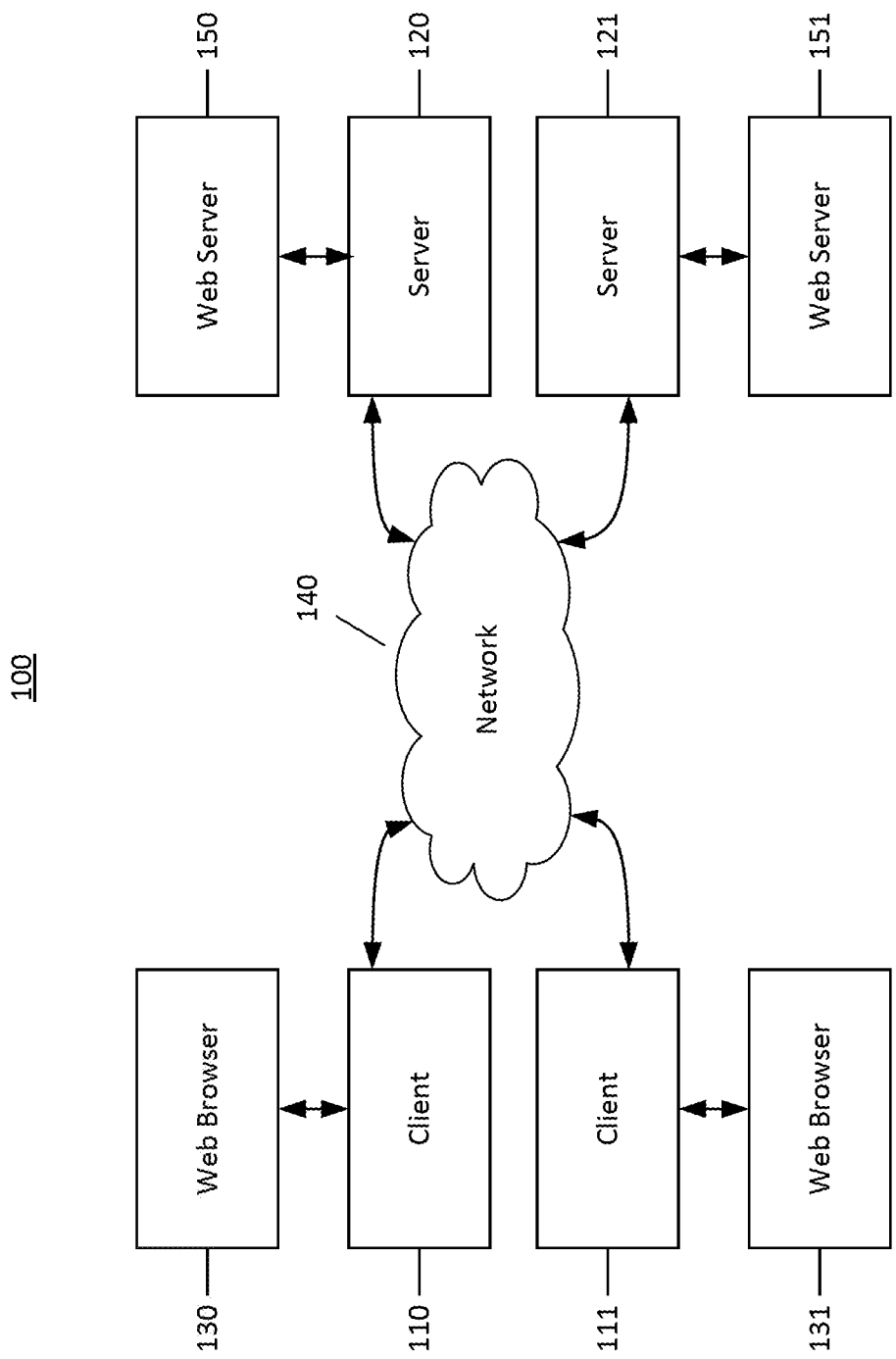
FIG. 1 illustrates an example network environment 100 where some embodiments of the invention may operate.

FIG. 1 illustrates an example network environment 100 where some embodiments of the invention may operate. The network environment 100 may include multiple clients 110, 111 connected to one or more servers 120, 121 via a network 140. Network 140 may include a local area network (LAN), a wide area network (WAN), a telephone network, such as the Public Switched Telephone Network (PSTN), an intranet, the Internet, or a combination of networks. Two clients 110, 111 and two servers 120, 121 have been illustrated for simplicity, though in practice there may be more or fewer clients and servers. Clients and servers may be computer systems of any type. In some cases, clients may act as servers and servers may act as clients. Clients and servers may be implemented as a number of networked computer devices, though they are illustrated as a single entity. Clients may operate web browsers 130, 131, respectively for display web pages, websites, and other content on the World Wide Web (WWW). Servers may operate web servers 150, 151, respectively for serving content over the web.

Figure 2:
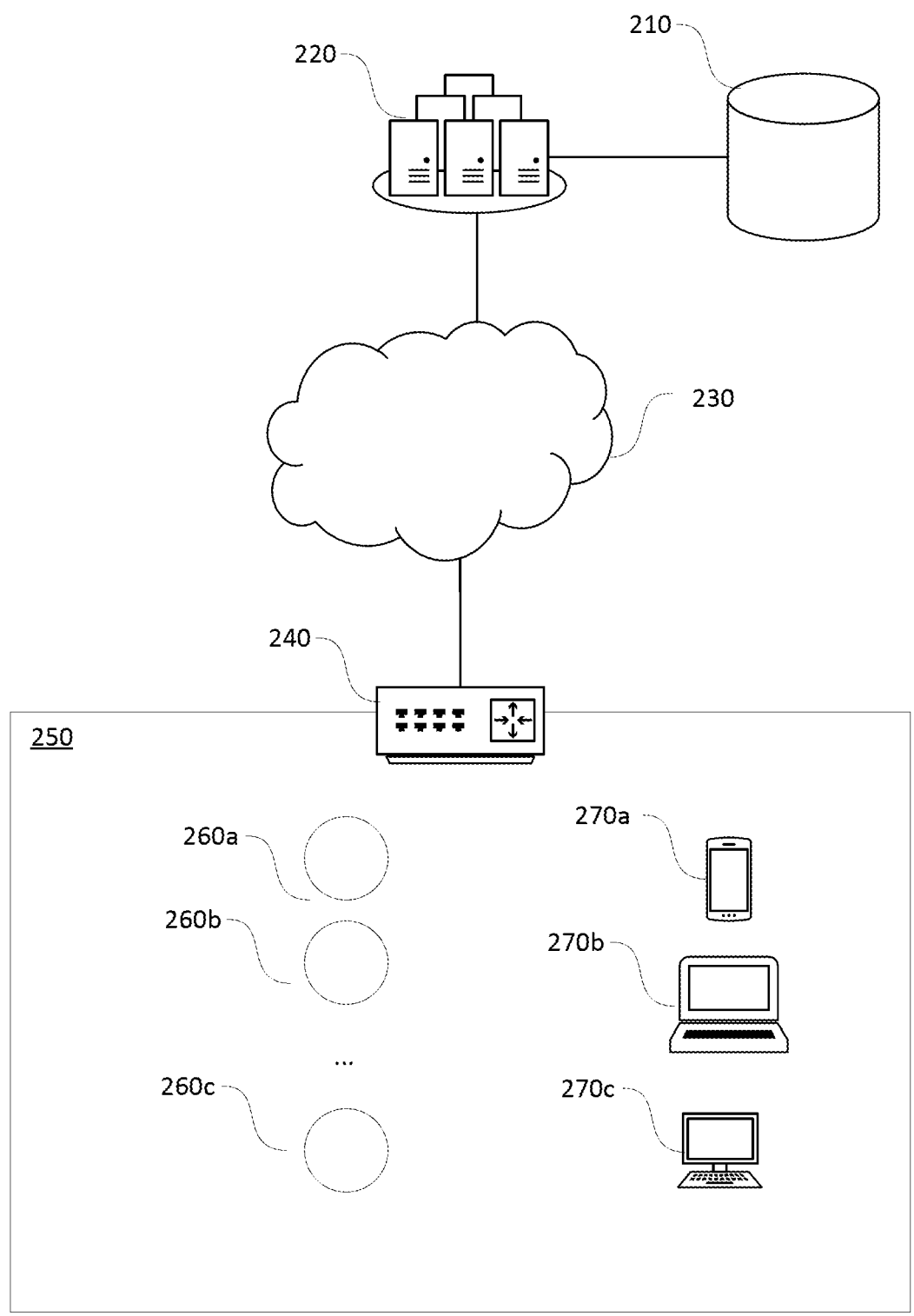
FIG. 2 illustrates an example computing environment of an emergency alert system according to an embodiment.
Figure 3:
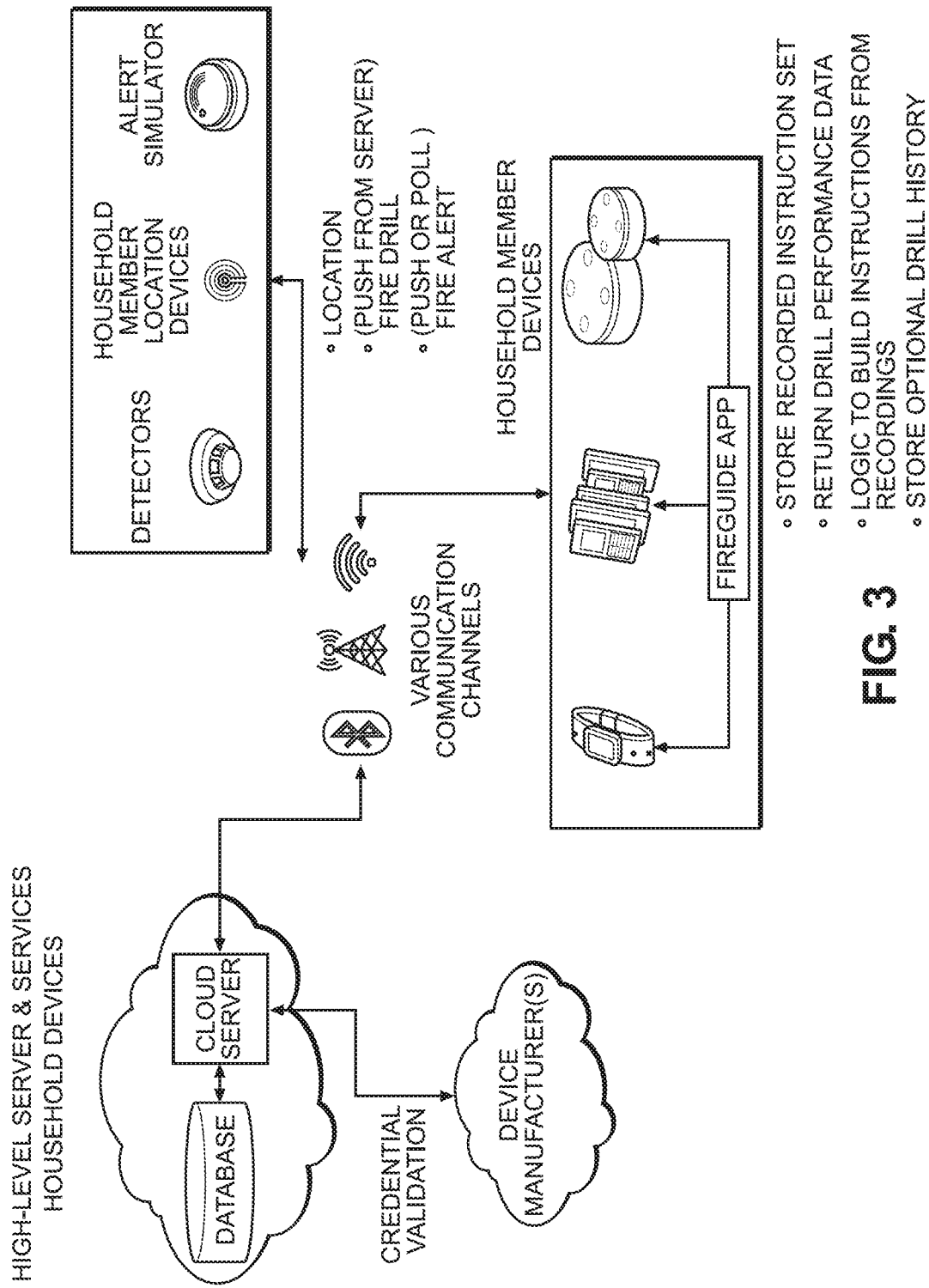
FIG. 3 illustrates aspects of an example computing environment of an emergency alert system according to an embodiment.

FIG. 2 illustrates an example computing environment for an emergency alert system according to an embodiment. In this example, a cloud server 220 executes instructions to perform some functions of an emergency alert system. The cloud server may be, for example, a server such as server 120 or 121 as illustrated in FIG. 1. Cloud server 220 may store various data in databases 210, such as administrative data or emergency response instruction data. Cloud server 220 communicates with home router 240 vis network 230. In an example, network 230 may be the Internet. Home router 240 provides network connectivity for various devices within home 250. For example, home 250 contains various computing devices 270a-c such as smartphone 270a, laptop computer 270b, and desktop computer 270c. Home 250 also contains various emergency detection devices 260a-c. While the illustrated example illustrates three computing devices and three emergency detection devices, any number of computing devices or emergency detection devices may be present in home 250. FIG. 3 illustrates aspects of another example computing environment of an emergency alert system according to an embodiment.

Figure 4:
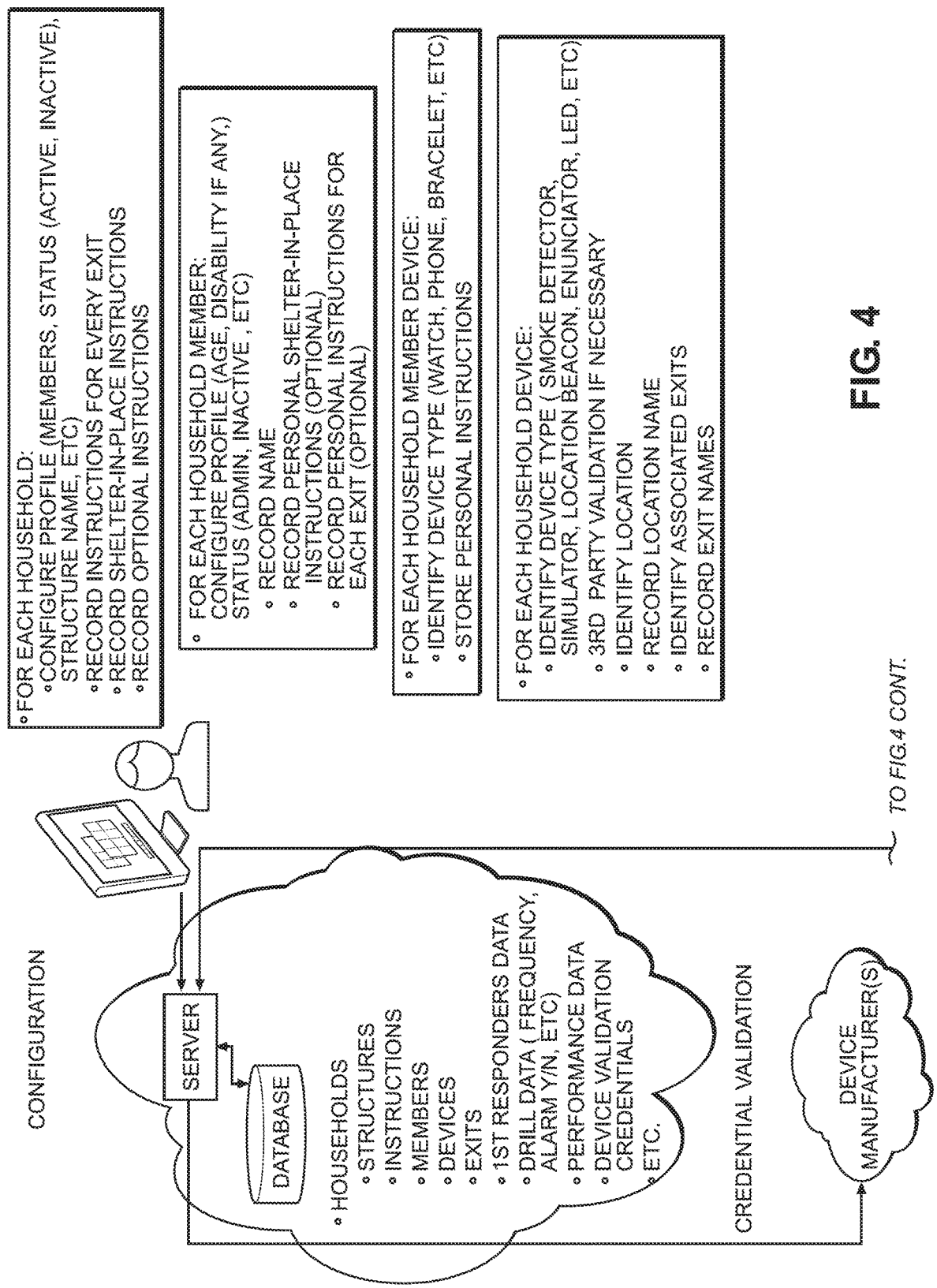
FIG. 4 illustrates aspects of an emergency alert system according to an embodiment.

FIG. 4 illustrates aspects of an emergency alert system according to an embodiment. In one aspect, an embodiment of an emergency alert system provides an administrative interface to allow administrative users to enter information about a building, emergency sensors within the building, occupants of the building, and devices associated with occupants of the building. In a home example, an administrative user may be a parent, for example. In an office building, an administrative user may be an office manager or a security staff.

In an example, the administrative interface may be implemented as a browser-based graphical user interface accessed through one of computing device 270a-c. Using this interface, an administrative user may enter details about a building. For each building, for example, an administrative user may enter a name of the building, a location of the building, occupants associated with the building, exit or egress paths out of the building, safe location for sheltering-in-place, emergency detection devices associated with the building, occupants associated with the building, first responder information, and electronic devices associated with occupants of the building. Examples of emergency detection devices 260a-c include fire alarms, smoke alarms, carbon monoxide alarms, security alarms, flood alarms, earthquake detectors, or any other such device that detects an emergency condition. In addition, simulated emergency detection devices may be associated with a building. Simulated emergency detection devices may provide for alarms that sound and look like functional emergency detection devices, but are able to be triggered manually so as to simulate an emergency condition. In an embodiment, simulated emergency detection devices recreate the sound of emergency detection devices, either through a recording of an emergency detection device, or through selection of one of the alarm tones provided. In some embodiments, information about emergency detection devices may be retrieved from a third-party source. For example, if the household has NEST smoke detectors, the system may uses the NEST API to establish a connection, present credentials, and gather the data associated with their configuration, such as location, version numbers, etc.

For occupants, an administrative user may enter the name of the occupant, any disabilities the occupant is associated with, a current status of the occupant, and any electronic devices associated with the occupant. Examples of electronic devices that may be associated with an occupant include smartphones, tablet computers, laptop computers, desktop computers, smart televisions, personal assistant devices such as AMAZON ALEXA devices, smart watches, and other such devices. In addition, buildings may include electronic devices such as location detection devices that may be associated with occupants as well. For example, a Bluetooth-based electronic beacon device may detect the proximity of an electronic device associated with a user.

The data entered by an administrative user via the administrative interface is stored in one or more administrative databases. Administrative databases may be located within the building, proximate to the building, or remote from the building. For example, administrative databases may be located in a remote datacenter. In some embodiments, multiple redundant copies of administrative databases may be located at multiple locations.

Through the administrative interface, an administrative user may also enter emergency response instructions. Emergency response instructions may be personalized to a particular occupant, building, emergency type, and other identifying information, for example. Therefore, emergency response instructions are associated with relevant associated entries in the administrative databases. For example, an emergency instruction may be associated with an occupant record, a building record, an exit within the building, and an emergency type identifier. In some embodiments, default or generic emergency response instructions may also be specified that are used in the absence of personalized instructions.

In some embodiments, emergency response instructions are recorded audio of spoken word instructions. In an example, the administrative user may record an audio recording of the emergency response instructions. In some embodiments, emergency response instructions may be recorded as text instructions. Other emergency response instruction formats may also be used, for example video formats or still picture formats. The administrative user may record multiple emergency response instructions specific for each household member. Because the administrative user can record custom instructions, the instructions are in the household vocabulary that will be understood by household members. Further, the response instructions may be presented by someone the occupant knows, further increasing their effectiveness for some occupants. For example, a mother may record personalized instructions for a child.

Figure 5:
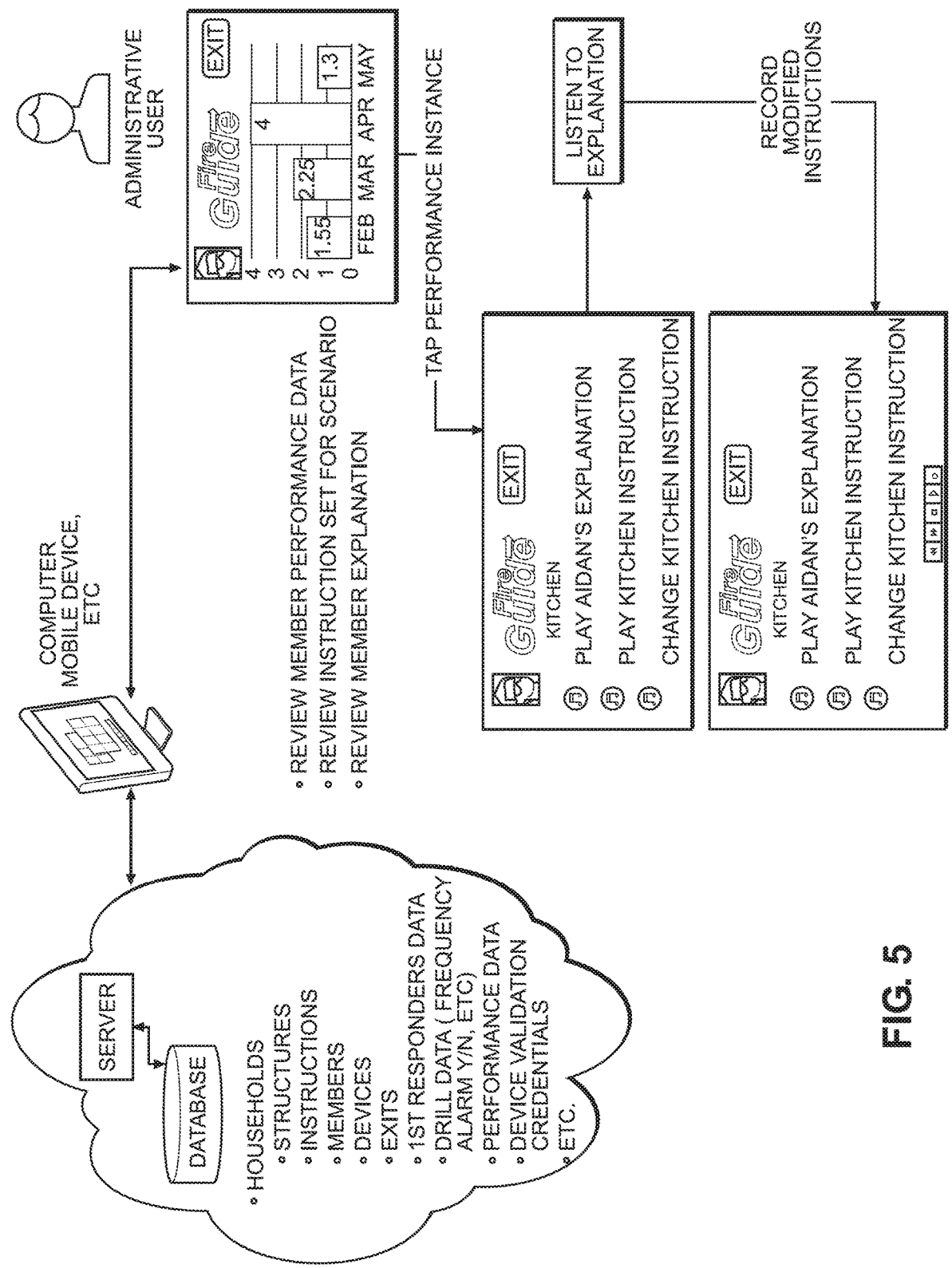
FIG. 5 illustrates aspects of an emergency alert system according to an embodiment.

FIG. 5 illustrates aspects of an emergency alert system according to an embodiment. In an aspect, embodiments of an emergency alert system provide for a training management dashboard. With the training management dashboard, administrative users may configure and schedule emergency response drills. For example, fire drills may be managed through the drill management dashboard. In addition, the training management dashboard may present information about past emergency drills. For example, an administrative user may review emergency drill performances over time and review instructions designated for various emergency scenarios. Through this example training management dashboard, administrative users may further review members' comments and feedback on emergency drills. By reviewing feedback, administrative users may improve the instructions for household members. For example, administrative users may modify instructions to improve performance of certain members. The illustrated example management dashboard further provides and interface for administrative users to change scheduled emergency drill frequency and initiate an emergency drill.

In an example, an administrative user may select a household member whose performance is to be reviewed. The application requests emergency drill data associated with the household member from the database via the server, and displays the returned drill performance data, including scenarios and dates drilled, graphically to show the household members' progress over time. The administrative user can use the training management dashboard to view the underlying performance data for each scenario date, including the instructions provided during the event and household member's comments after the drill.

Figure 6:
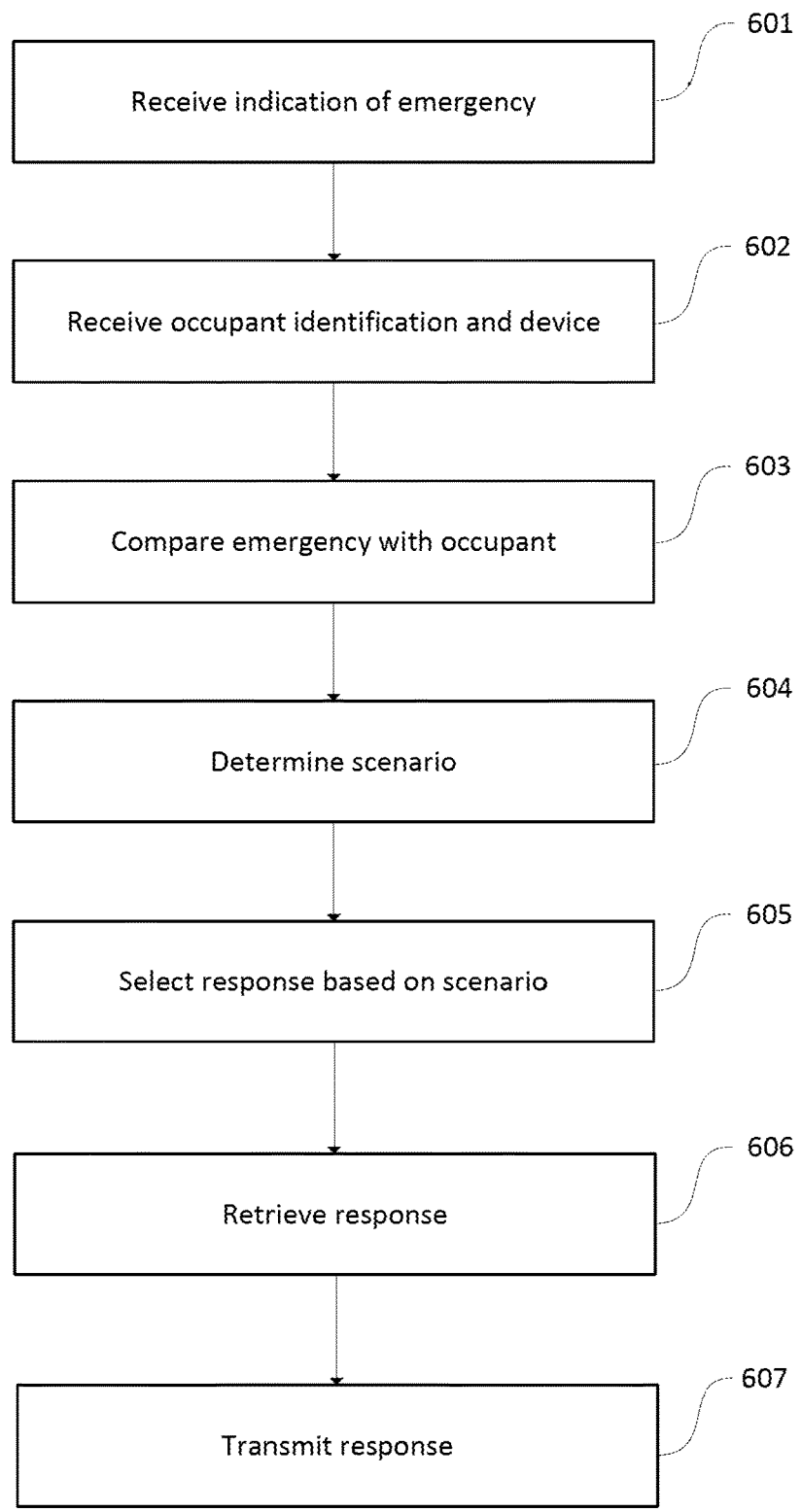
FIG. 6 illustrates an example method for an emergency alert according to an embodiment.

FIG. 6 illustrates an example method for an emergency alert according to an embodiment. At step 601, an emergency alert system receives an indication of an emergency. The emergency alert may include information such as the type of emergency, the location of the building where the emergency is located, and the location within the building of the emergency. In an example, an emergency may indicate a fire condition on the second floor of a home at a particular address. In some embodiments, the emergency alert system may periodically poll a set of emergency detection devices. In some embodiments, the emergency alert system may be a passive receiver of communications from emergency detection devices.

At step 602, the emergency alert system determines occupants of the building where the emergency is located that may be in danger. First, a list of occupants may be determined, and second a list of devices associated with the occupants may be determined. For example, the emergency alert system may determine that an occupant named Aidan is associated with the home in the example above. Then, the emergency alert system may determine that Aidan is associated with a particular smartphone device and that the smartphone device is located in a bedroom on the second floor of the home. At step 603, the location of the emergency is compared with the location of the computing device. Then, at step 604, the emergency alert system may determine an emergency alert scenario based on the location of the emergency and the location of the computing device. In the example above, the emergency scenario may be related to an emergency fire egress from the home from the second floor in the event of a second floor fire. Then, at step 605, the emergency alert system may select an appropriate set of emergency response instructions corresponding to the emergency scenario. In some embodiments, the emergency response instructions may direct the emergency alert system to transmit a message to emergency first responder services. For example, the emergency alert system may initiate a phone call to an emergency dispatching service and play a recorded message that includes information about the emergency in progress and the disability, if any, of the Occupant and optionally his location as well.

At step 606, the emergency alert system may retrieve the selected emergency response instructions. In the example above, the emergency response instructions may be an audio recording instructing Aidan to exit through a particular exit from the second floor of the home. At step 607, the emergency alert system transmits the emergency response instructions to the identified device, and the device presents the emergency response instructions. In some embodiments, the emergency alert system may be located remotely from the computing device and may transmit the entire emergency response instructions to the computing device. In other embodiments, the emergency alert system may transmit an identifier of the emergency response instructions to the computing device, removing the need to transmit large amounts of data in the event of an emergency.

In some embodiments, relevant portions of the emergency alert system may be implemented on the computing device, and all emergency response instruction data stored locally on the computing device. In some embodiments, the computing device may communicate directly with emergency detection devices. For example, a fire alarm in a home may transmit an indication of a fire alarm condition directly to a smartphone via Wi-Fi or Bluetooth.

In some embodiments, an emergency alert agent is implemented on a computing device that interacts with the emergency alert system. For example, an emergency alert agent may be implemented as a software package on a smartphone device.

Figure 7:
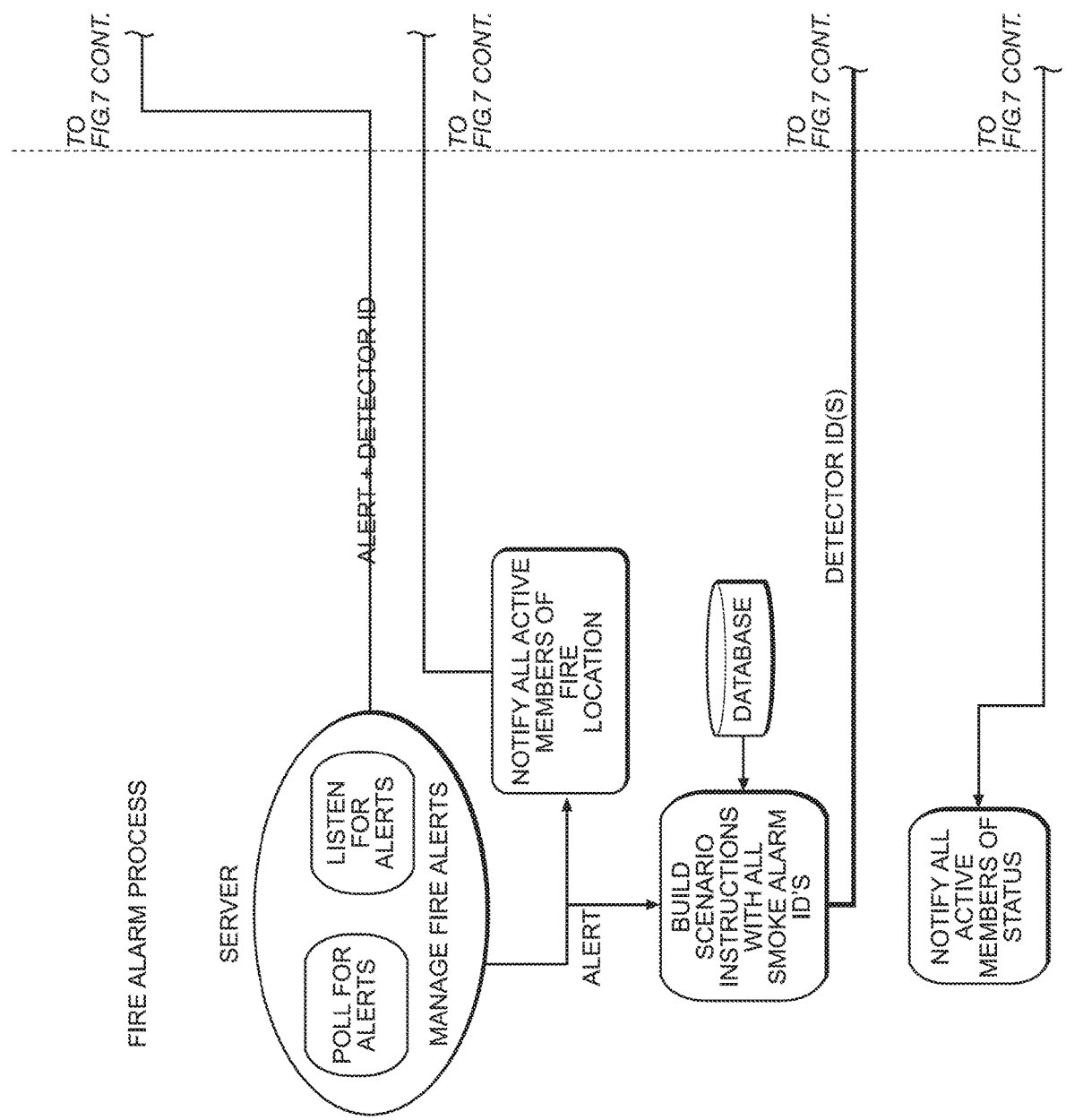
FIG. 7 illustrates an example method for an emergency alert according to an embodiment.
Figure 7:
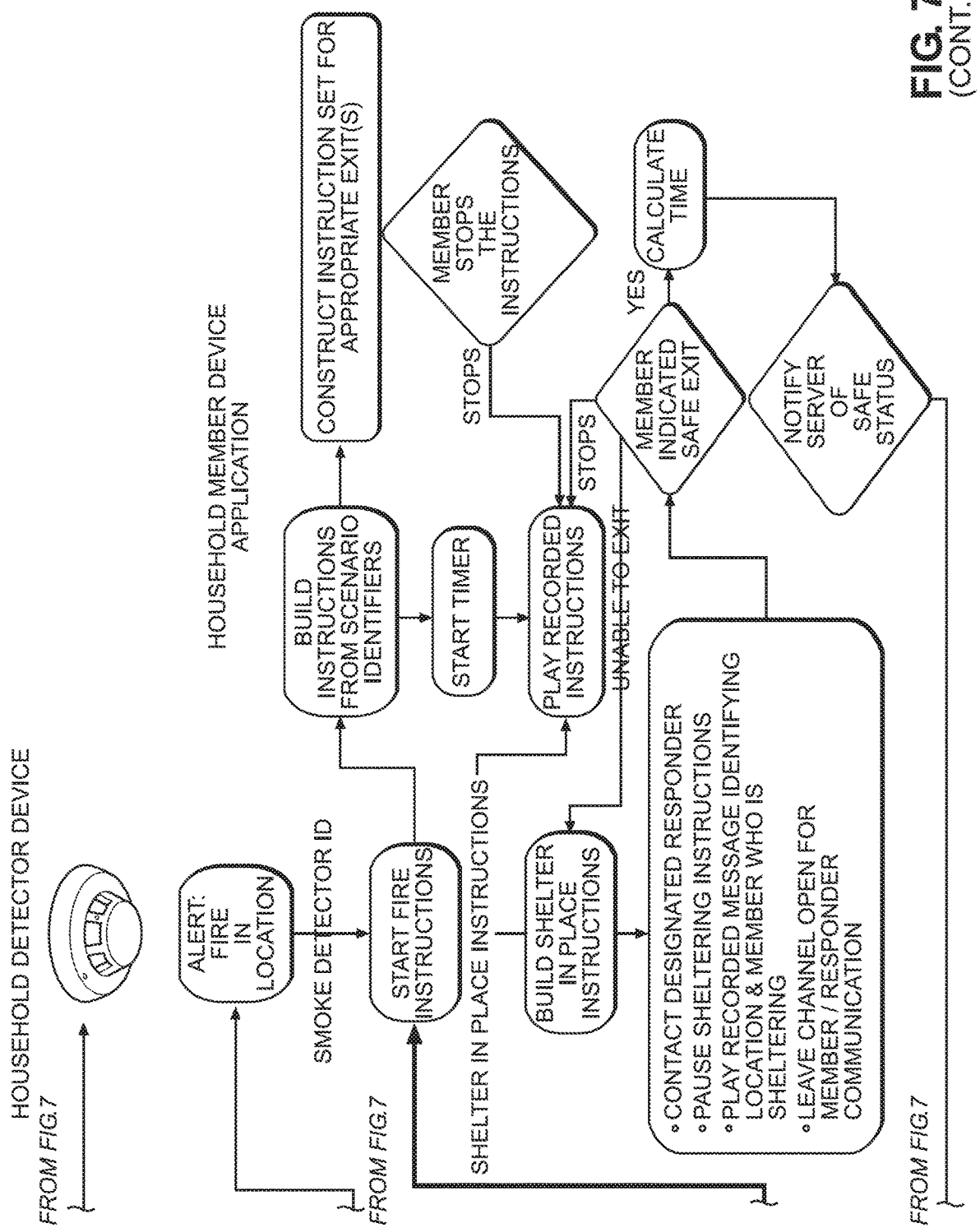

In some embodiments, the computing device starts a timer when it begins outputting the emergency alert instructions. The timer may be implemented by the emergency alert agent in an embodiment. The timer measures how long an occupant takes to reach safety. Once the occupant reaches safety, they may signal to the emergency alert agent that they are safe, and the timer stops. At that time, the emergency alert agent may also stop outputting the emergency response instructions. In some embodiments, the occupant safety condition may be detected by the emergency alert system based on a detected location of the computing device. For example, a Bluetooth beacon may be located in a safe area, and the computing device determines the occupant is safe when the emergency alert agent on the computing device detects a proximity to the beacon. In some embodiments, the emergency alert agent may transmit the recorded time to the emergency alert system for recording and review of occupant performance. FIG. 7 illustrates some of these aspects and more in the context of an example method for an emergency alert according to an embodiment.

Figure 8:
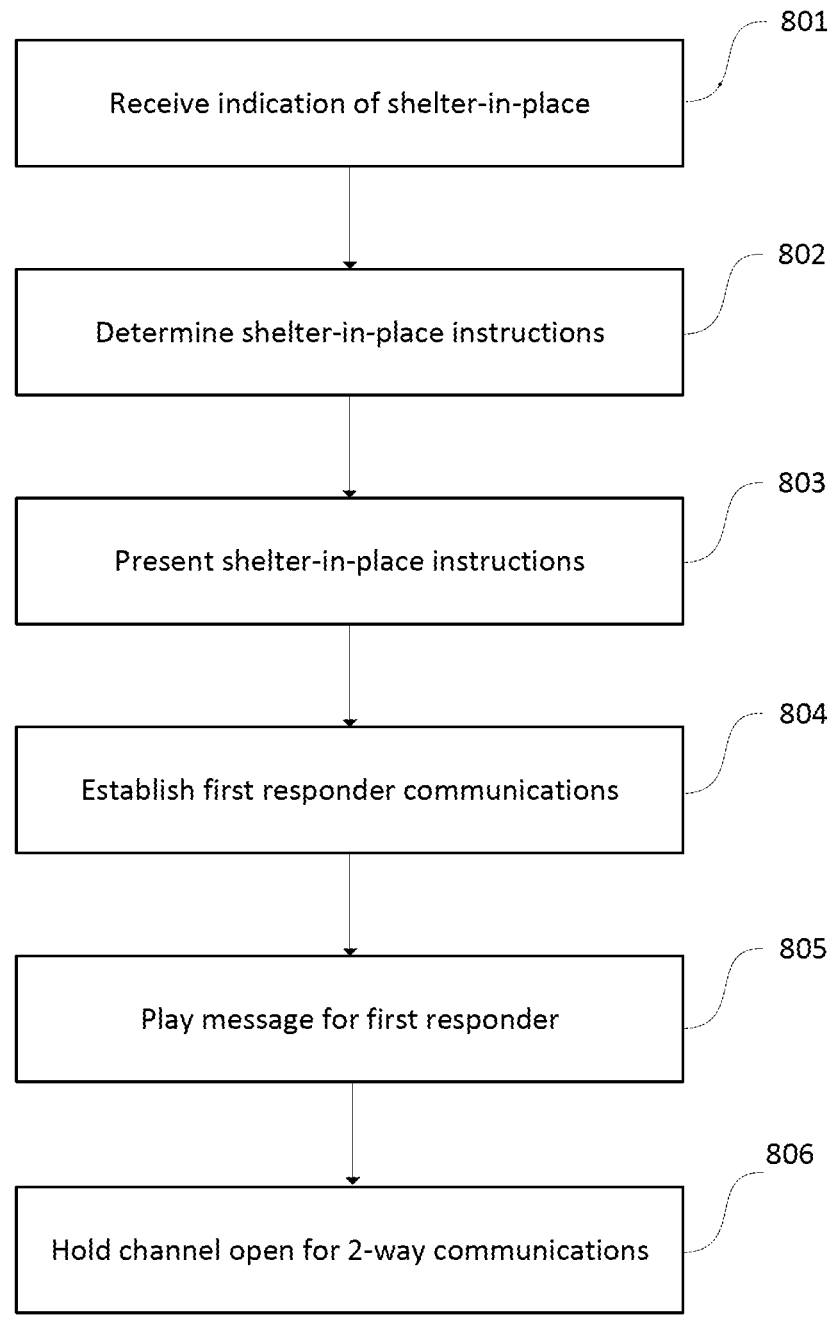
FIG. 8 illustrates an example method for an emergency alert with a shelter-in-place condition according to an embodiment.

FIG. 8 illustrates an example method for an emergency alert with a shelter-in-place condition according to an embodiment. In some emergency situations, an occupant may not be able to follow emergency instructions to exit a building during an emergency. For example, a fire may block a critical egress route, making it unsafe for an occupant to exit. In another example, a security situation may block a potential egress route and render an occupant unable to follow emergency response instructions. In these cases, an occupant may signal to the emergency alert system that they are unable to follow emergency response instructions. In an embodiment, the occupant may do so by an interface of the emergency alert agent, for example by tapping a button on a smartphone device running an emergency alert agent.

At step 801, the emergency alert agent may then transmit an indication that the occupant is unable to comply with the emergency response instructions to the emergency alert system. In response, at step 802 the emergency alert system may determine a second set of emergency response instructions for the occupant. For example, the second set of emergency response instructions may include instructions to shelter in-place, i.e., find a safe place within the building to wait for emergency responders. At step 803 the system may cause the computing device to present the second set of emergency response instructions.

In the event that the emergency alert agent is unable to communicate with the emergency alert system, the emergency alert agent may determine shelter-in-place instructions and present the instructions to the occupant. In some embodiments, the emergency alert agent may establish a communication channel with an emergency responder to aid in their response at step 803. For example, the emergency alert agent may call an emergency response dispatch number to connect the occupant with an emergency response dispatcher. In an embodiment, the emergency alert agent may call an administrative user to aid the occupant.

Figure 9:
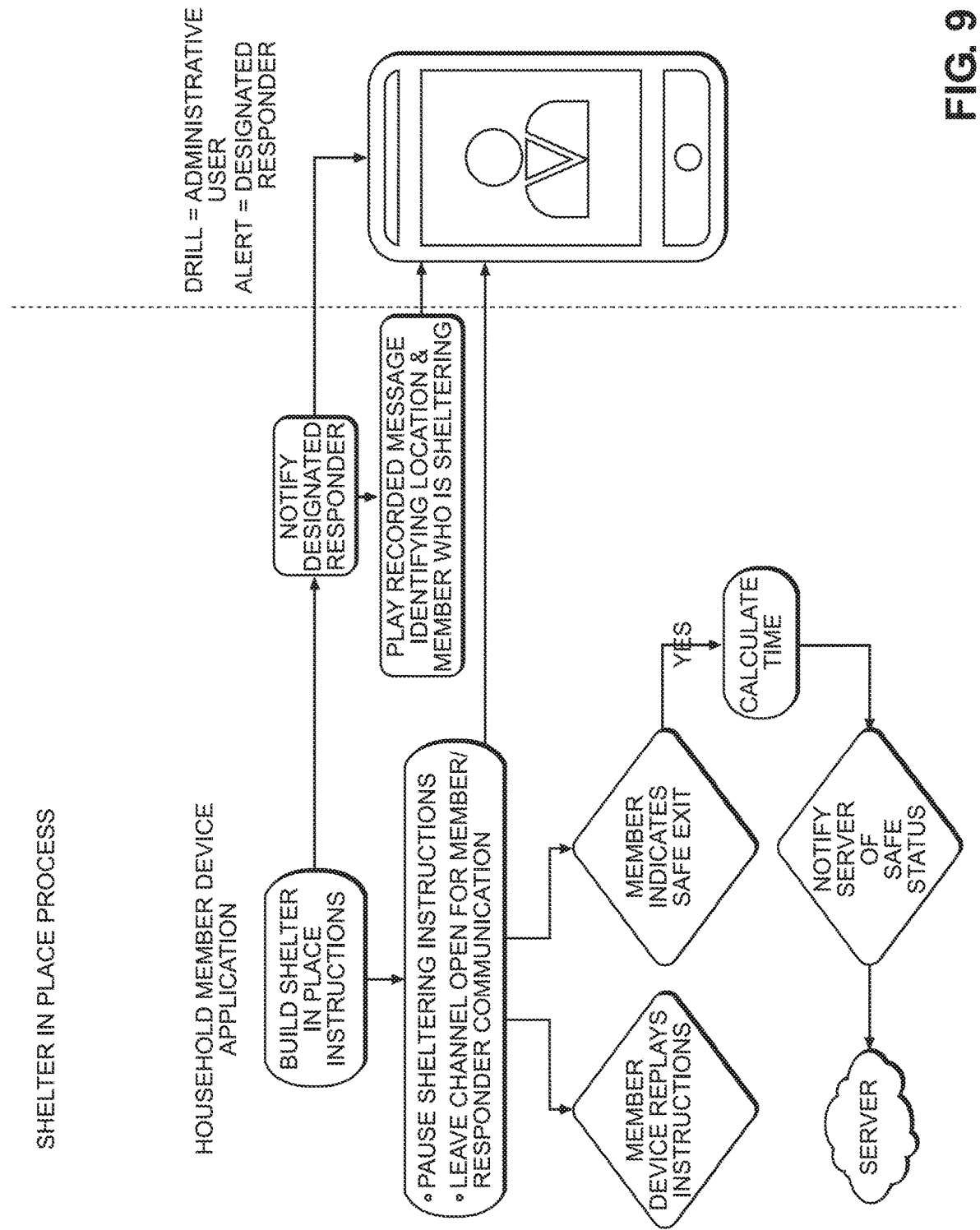
FIG. 9 illustrates an example method for an emergency alert with a shelter-in-place condition according to an embodiment.

In any case, at step 805 the emergency alert agent may play a prerecorded message for the emergency responder dispatcher or administrative user to provide information about the occupant's situation such as the address of the structure, the occupant information of the occupant who is sheltering in place, and any important information about that person, such as cognitive or physical impairments. Once the recording has finished playing, the line remains open and the occupant is in contact with the first responder. FIG. 9 illustrates some of these aspects and more in the context of an example method for an emergency alert with a shelter-in-place condition according to an embodiment.

Figure 10:
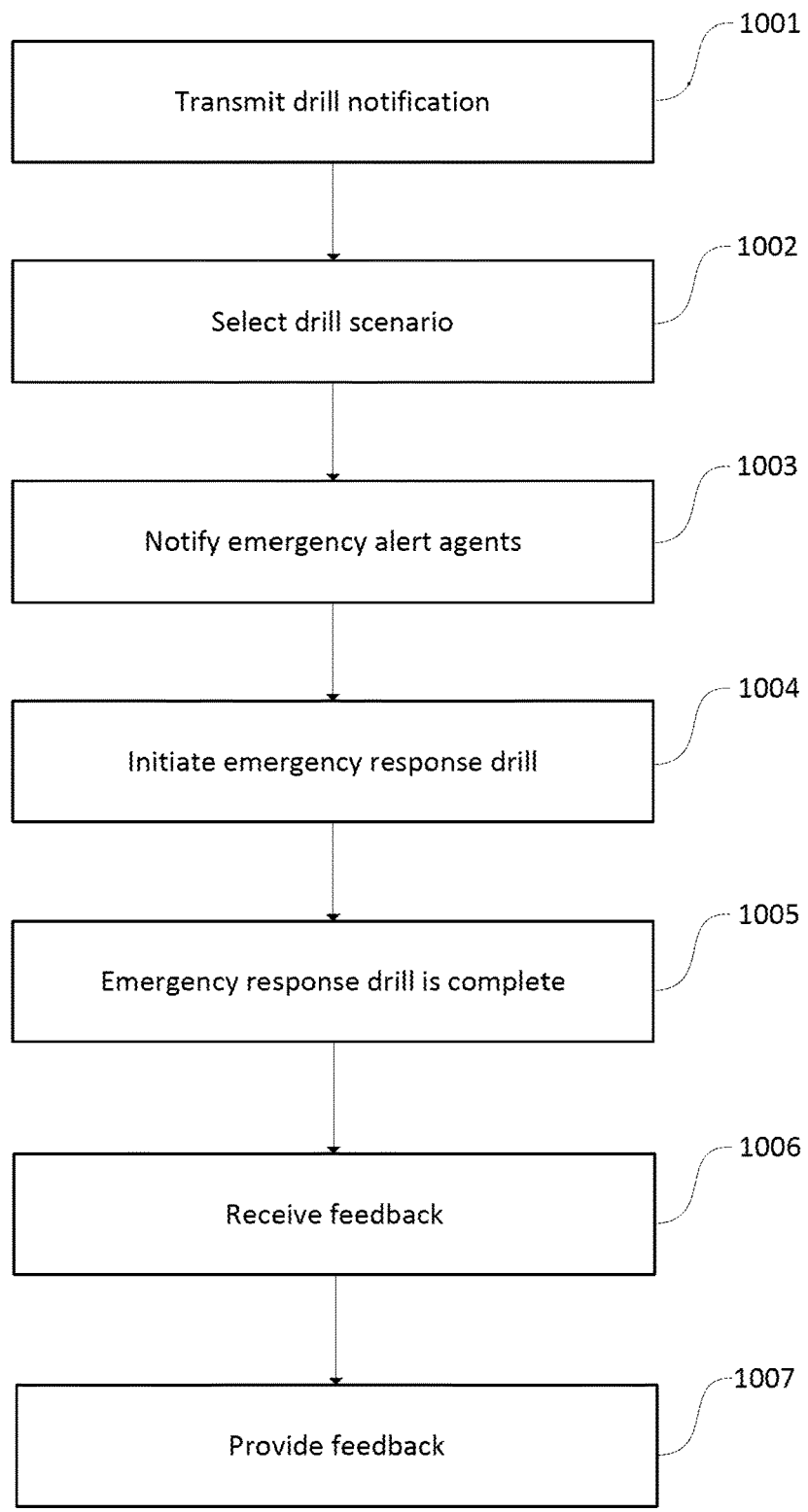
FIG. 10 illustrates an example method for conducting an emergency response drill using an embodiment of the disclosed emergency alert system.

FIG. 10 illustrates an example method for conducting an emergency response drill using an embodiment of the disclosed emergency alert system. Aspects of embodiments of the emergency alert system relate to the management and initiation of emergency response drills. In an embodiment, an administrative user may set a regular schedule for emergency response drills that the emergency alert system performs.

At step 1001, the emergency alert system transmits a notification of an upcoming emergency response drill to an administrative user. This allows the administrative user to prepare for the drill. In an embodiment, the emergency alert system notifies the administrative user that a drill is scheduled to begin within a configured timeframe so the administrative user is apprised of the upcoming drill but not anticipating it at a particular time. This may add to the realism of the drill. The administrative user may decline to run the drill, but the system requires her to specify the number of days later to reschedule the drill.

When the administrative user consents to the drill, at step 1002, the system selects a drill scenario. In an example, the system builds a scenario based upon past history such as selecting scenarios which have not been executed or scenarios which have historically poor response time. In some embodiments, the system may select a scenario at random. A drill scenario includes an identification of emergency detection devices to simulate as alerting. In addition to the scenario, the system acquires the length of time it took the member to complete the scenario the last time it ran ("response time") from the database.

At step 1003, the system may notify emergency alert agents on devices in the possession of occupants that a drill is about to happen for the selected scenario. The occupant may request a delay, decline if she is not in the house, or accept. If so configured, the system also notifies first responders and performs any other notifications or actions established for that household as set up during the configuration.

At step 1004, the emergency alert system initiates the drill by triggering a simulated emergency alarm. For example, the drill may trigger a simulated fire alarm. The emergency drill proceeds as if the emergency was real, similar to the methods described above.

Once occupants have reached safety, the emergency response drill is completed at step 1005. The system receives response time information from occupant's devices and stores the time it took for each occupant to complete the drill. At step 1006, the system may also receive comments or feedback from occupants regarding the drill such as any comments made by the occupant to explain their experience or problems in the scenario. In an embodiment, the emergency alert agent may record the occupant's feedback as audio or video and transmit the feedback to the emergency alert system.

Figure 11:
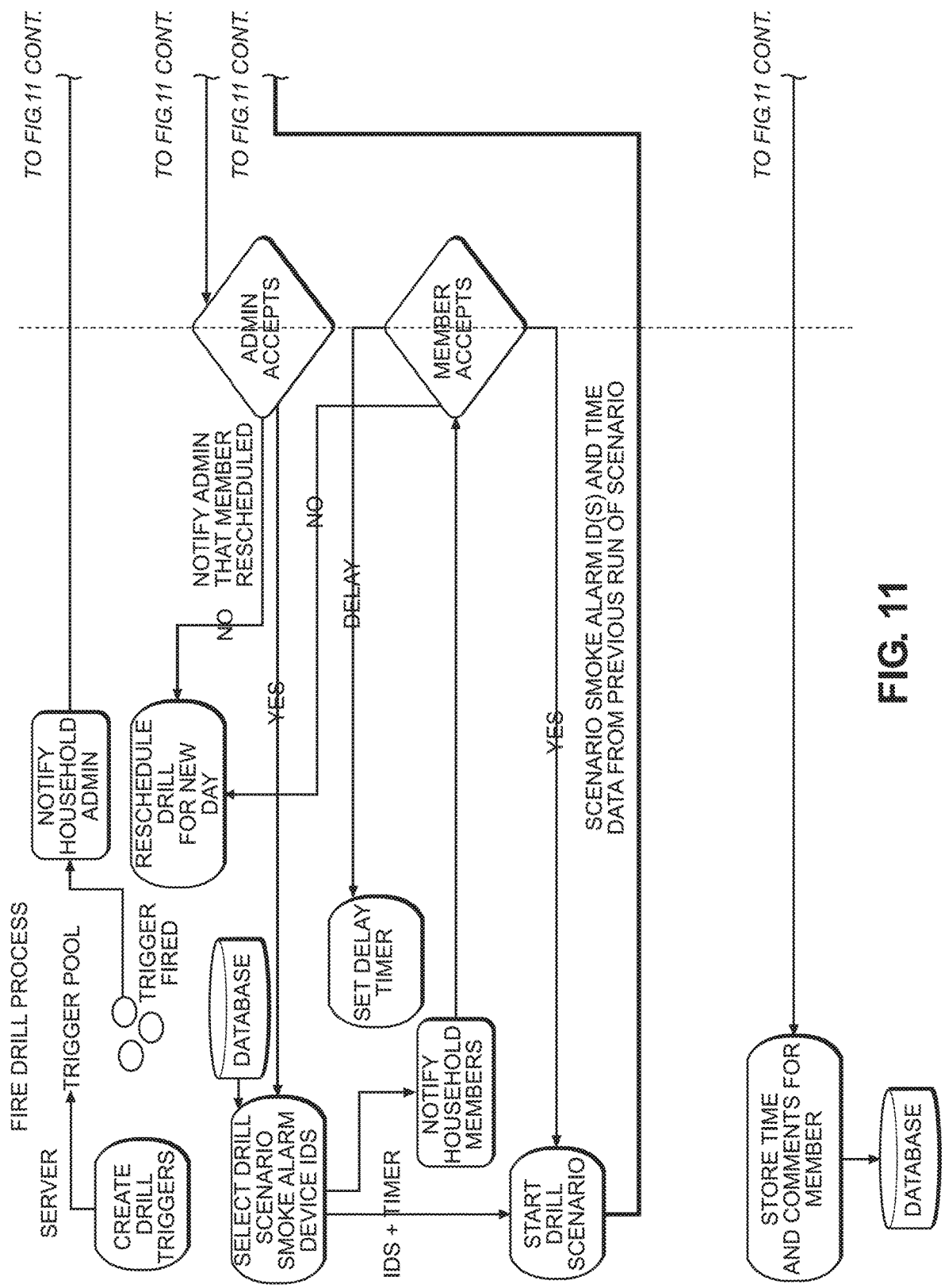
FIG. 11 illustrates an example method for conducting an emergency response drill using an embodiment of the disclosed emergency alert system.
Figure 11:
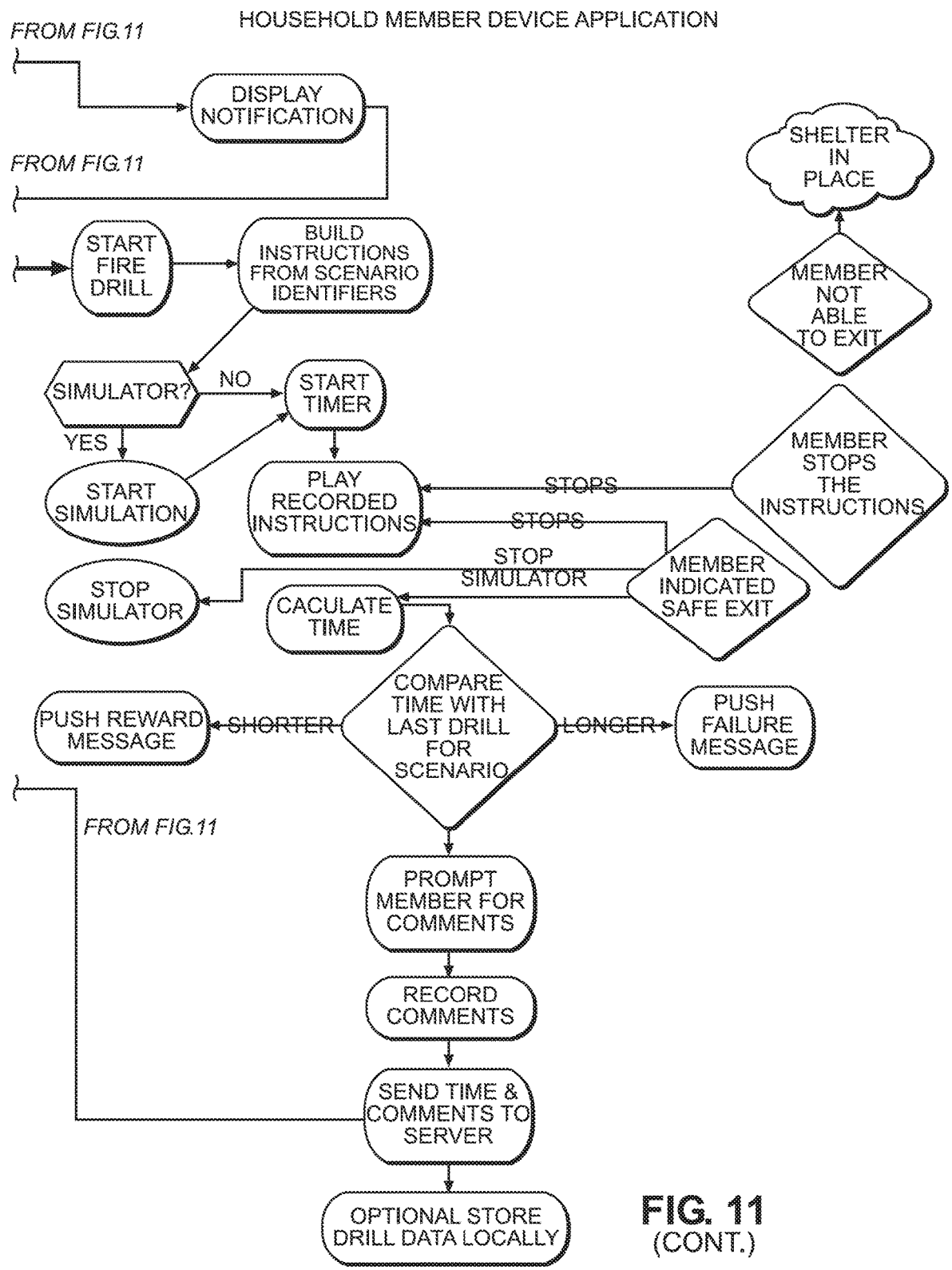

At step 1007, the emergency alert agent may provide feedback to the user or occupant. For example, the emergency alert agent may display a message congratulating the user on a successful drill. In an embodiment, the system may determine if a drill is successful by comparing the current recorded response time to historic response times. If the response time has worsened, the emergency alert agent may display negative feedback, prompt for the reasons, and suggest ways to improve emergency response times in future drills. FIG. 11 illustrates some of these aspects and more in relation to an example method for conducting an emergency response drill using an embodiment of the disclosed emergency alert system.

Figure 12:
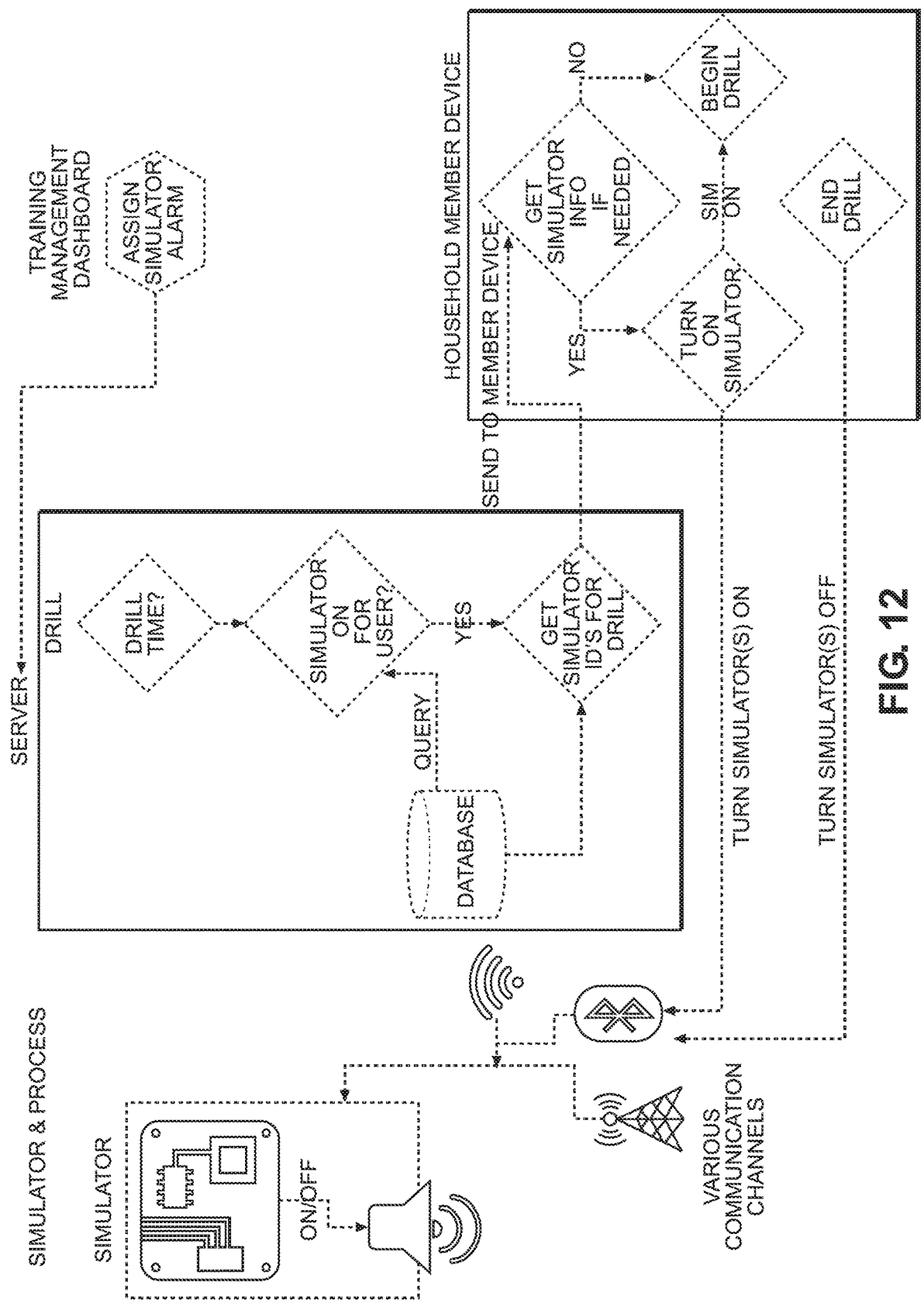
FIG. 12 illustrates aspects of an example method for conducting an emergency response drill using an embodiment of the disclosed emergency alert system.

In some embodiments, emergency response drills may be controlled by an emergency alert agent operating on a computing device associated with an occupant. In an example, the emergency alert agent builds the instructions from the data sent by the server using its logic and the stored instructions. It also starts a timer to track response time. If one or more simulators are to be used in the drill, the emergency alert agent turns them on via Bluetooth, Wi-Fi, or cellular. The emergency alert agent displays its drill interface to the user or occupant, while playing the drill instructions. The interface consists of graphical user interface elements that enable the user to stop the instructions, indicate their completion of the exercise, or simulate an inability to exit. FIG. 12 illustrates some of these aspects and more in relation to an example method for conducting an emergency response drill using an embodiment of the disclosed emergency alert system.

Figure 13:
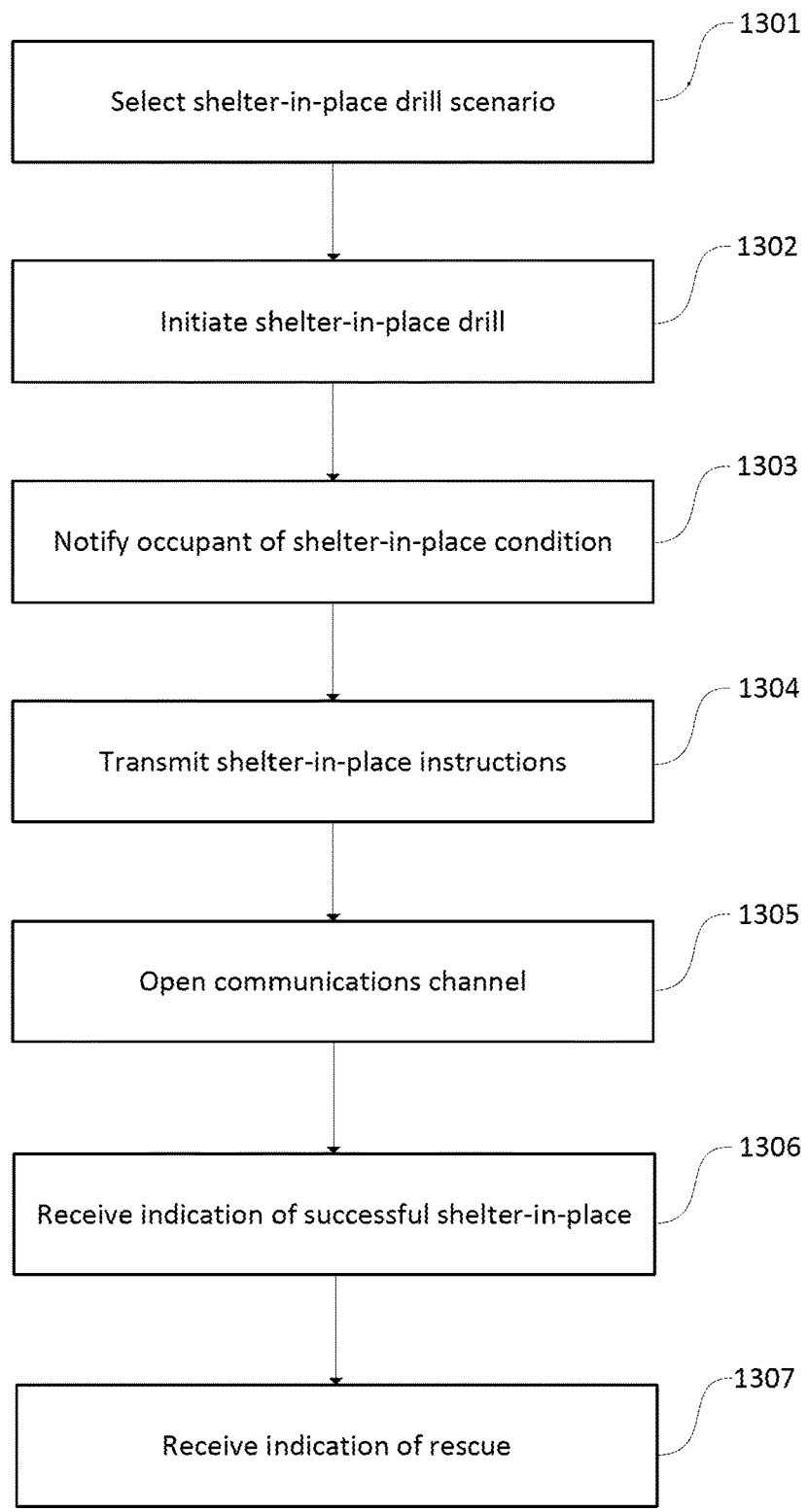
FIG. 13 illustrates an example method for performing a shelter-in-place drill according to an embodiment.

FIG. 13 illustrates a method for performing a shelter-in-place drill according to an embodiment. The shelter-in-place drill proceeds similarly to the standard emergency drill, but is modified to reflect a situation in which the occupant is unable to comply with the emergency response instructions. At step 1301, a shelter-in-place scenario is selected for an emergency response drill. At step 1302, the emergency alert system initiates the drill by triggering a simulated emergency alarm. At step 1303, the emergency alert system notifies an occupant participating in the drill that for the purposes of the drill, they are unable to comply with the emergency response instructions. For example, an emergency response agent on a user's computing device may indicate that the drill is a shelter-in-place drill and that the user is unable to comply with the emergency response instructions. At step 1304, the system may transmit alternative shelter-in-place response instructions to the occupant. At step 1305, a communication channel may be opened between an administrative user acting as an emergency response dispatcher and the occupant participating in the drill. This mimics the real shelter-in-place emergency method as described above. At step 1306, the occupant may indicate that they have reached the shelter-in-place location and are safe. Then, at step 1307, an administrative user may indicate to the emergency alert system that they, acting as emergency responders for the purposes of the drill, have reached the shelter-in-place location and have rescued the occupant. This concludes the shelter-in-place drill. Feedback and data collection proceed similar to a standard emergency response drill as described above.

What is claimed is:

1. A method for performing an emergency response drill, the method comprising:
    causing, by a computing platform, transmission of one or more software package instructions for execution of an emergency alert agent to a mobile computing device;
    receiving, by the computing platform, a request for historical emergency drill data for display in a graphical user interface representing an emergency drill management dashboard, the historical emergency drill data associated with a user of the mobile computing device and further comprising previous emergency response instructions for an emergency response drill scenario;
    detecting, by the computing platform, modification input received at the emergency drill management dashboard for generating modified emergency response instructions;
    causing, by the computing platform, initiation of the emergency response drill scenario based on (i) an alarm tone triggered at a remotely located emergency detection device simulator and (ii) transmission of the modified emergency response instructions to the mobile computing device; and
    receiving, by the computing platform, completion data sent from the emergency alert agent executing on the mobile computing device, the completion data indicative of an elapsed time associated with the modified emergency response instructions.

2. The method of claim 1, wherein the completion data comprises an elapsed time recorded by the emergency alert agent, the elapsed time based on completion of the modified emergency response instructions.

3. The method of claim 1, wherein the elapsed time occurs between receipt at the mobile computing device of (i) the modified emergency response instructions and (ii) the completion data selected by the user of the mobile computing device, wherein receipt of the modified emergency response instructions comprises activation of the emergency response drill scenario on the mobile computing device.

4. The method of claim 3, wherein the completion data selected by the user of the mobile computing device indicates that the user failed to successfully complete the modified emergency response instructions.

5. The method of claim 1, wherein the modified emergency response instructions comprise instructions to cause the emergency alert agent to play at least one of: an audio version of the modified emergency response instructions and a video version of the modified emergency response instructions.

6. The method of claim 5, wherein the audio version of the modified emergency response instructions comprise:
    an audio recording that describes an exit in a physical domicile of the user of the mobile computing device.

7. The method of claim 1, further comprising:
    transmitting to the mobile computing device, by the computing platform, dashboard data to cause display of at least a portion of the emergency drill management dashboard at the mobile computing device, wherein the dashboard data further includes a representation of a schedule for one or more future sessions of the emergency response drill scenario for the user and one or more members of a household associated with the user of the mobile computing device;
    receiving from the mobile computing device, by the computing platform, at least one of:
        (i) a selection of another future session of the emergency response drill scenario for the user or one or more members of the household; and
        (ii) a change of a timing of a respective future session of the emergency response drill scenario.

8. The method of claim 1, wherein the emergency drill management dashboard displays data indicating whether the user of the mobile computing device has at least one of: a cognitive impairment and a physical impairment.

9. The method of claim 1, wherein the emergency response instructions and the modified emergency response instructions both include a respective instruction to trigger contacting a third-party emergency first responder service.

10. The method of claim 1, further comprising:
    upon receipt of the completion data sent from the emergency alert agent, incorporating the elapsed time into the historical emergency drill data.

11. The method of claim 1, further comprising:
    upon receipt of the completion data sent from the emergency alert agent, comparing the elapsed time to at least a portion of the historical emergency drill data.

12. The method of claim 1, further comprising:
    providing feedback to the emergency alert agent based on the elapsed time.

13. The method of claim 1, wherein causing initiation of the emergency response drill scenario based on an alarm tone triggered at a remotely located emergency detection device comprises:
    causing the mobile computing device to establish a communications channel with the emergency detection device simulator in order to trigger the alarm tone.

14. The method of claim 13, wherein causing the mobile computing device to establish a communications channel with the emergency detection device comprises:

causing transmission of a connection request through an application programming interface (API) associated with the emergency detection device simulator.

15. The method of claim 1, wherein receipt of the completion data sent from the emergency alert agent is based on the emergency alert agent detecting a threshold proximity of the mobile computing device to a remotely located beacon device.

16. The method of claim 15, wherein the beacon device is situated in a physical building associated with the user of the mobile computing device.

17. The method of claim 1, wherein the modified emergency response instructions comprise shelter-in-place instructions.

18. The method of claim 1, wherein receiving, by the computing platform, a request for historical emergency drill data for display in a graphical user interface representing an emergency drill management dashboard:
 causing, by the computing platform, the emergency drill management dashboard to display at least a portion of the historical emergency drill data and an indication of an upcoming range of time during which the emergency response drill scenario is scheduled to be performed.

19. The method of claim 1, wherein transmission of the modified emergency response instructions to the mobile computing device comprises:
 transmission of build instructions associated with the modified emergency response instructions to the emergency alert agent, the build instructions causing the emergency alert agent to locally generate the modified emergency response instructions at the mobile computing device.

20. The method of claim 1, further comprising:
 upon receiving the request for the historical emergency drill data:
  accessing, by the computing platform, a database linked to the computing platform for retrieval of the historical emergency drill data.

21. The method of claim 1, wherein causing, by the computing platform, initiation of the emergency response drill scenario further comprises:
 causing initiation of the emergency response drill scenario based on receipt, through an application programming interface (API), an indication that an emergency has been detected by an emergency detection device.

* * * * *